(12) United States Patent
Lee et al.

(10) Patent No.: US 9,436,253 B2
(45) Date of Patent: Sep. 6, 2016

(54) DYNAMIC VOLTAGE FREQUENCY SCALING METHOD AND APPARATUS

(71) Applicant: Samsung Electronics Co., Ltd., Suwon-si (KR)

(72) Inventors: Hwang Sub Lee, Anyang-si (KR); Jong Lae Park, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 307 days.

(21) Appl. No.: 13/957,982

(22) Filed: Aug. 2, 2013

(65) Prior Publication Data
US 2014/0068285 A1    Mar. 6, 2014

(30) Foreign Application Priority Data

Aug. 29, 2012 (KR) .......................... 10-2012-0095142

(51) Int. Cl.
*G06F 1/26* (2006.01)
*G06F 1/04* (2006.01)
*G06F 1/32* (2006.01)

(52) U.S. Cl.
CPC ............. *G06F 1/3203* (2013.01); *G06F 1/324* (2013.01); *G06F 1/3296* (2013.01); *Y02B 60/1217* (2013.01); *Y02B 60/1285* (2013.01)

(58) Field of Classification Search
CPC .... G06F 1/324; G06F 1/3296; G06F 1/3203; Y02B 60/1285; Y02B 60/1217
USPC .......................................... 713/300, 320, 322
See application file for complete search history.

(56) References Cited

U.S. PATENT DOCUMENTS

| | | | |
|---|---|---|---|
| 7,421,601 B2* | 9/2008 | Bose et al. ..................... 713/320 |
| 7,721,127 B2* | 5/2010 | Vishin et al. .................. 713/322 |
| 8,510,740 B2* | 8/2013 | Salsbery et al. .............. 718/102 |
| 8,531,225 B1* | 9/2013 | Hussain ........................ 327/276 |
| 8,788,866 B2* | 7/2014 | Anderson et al. ............ 713/340 |
| 2009/0015232 A1* | 1/2009 | Rozen ....................... G06F 1/26 323/318 |
| 2009/0049314 A1 | 2/2009 | Taha et al. |
| 2009/0204830 A1* | 8/2009 | Frid ....................... G06F 1/3203 713/322 |
| 2011/0093724 A1 | 4/2011 | Park et al. |
| 2012/0216054 A1 | 8/2012 | Cho et al. |
| 2013/0275790 A1* | 10/2013 | Suzuki et al. ................ 713/322 |

* cited by examiner

*Primary Examiner* — Mark Connolly
(74) *Attorney, Agent, or Firm* — Onello & Mello, LLP

(57) ABSTRACT

System-on-a-chip (SOC) includes a dynamic voltage frequency scaling (DVFS) control unit; and a central processing unit (CPU) to operate the DVFS control unit. By using the DVFS control unit, a DVFS table may be selectively used according to any of various scenarios or modes of operation, thereby performing DVFS control.

20 Claims, 14 Drawing Sheets

FIG. 3A

| CPU_Freq(Hz) | Up-Threshold | OFSL Ratio |
|---|---|---|
| 1300000 | 117000000 | 90 |
| 1200000 | 108000000 | 90 |
| 1100000 | 99000000 | 90 |
| 1000000 | 90000000 | 90 |
| 900000 | 81000000 | 90 |
| 800000 | 72000000 | 90 |

FIG. 3B

| CPU_Freq(Hz) | Down-Threshold | OFSL Ratio |
|---|---|---|
| 1300000 | 104000000 | 80 |
| 1200000 | 96000000 | 80 |
| 1100000 | 88000000 | 80 |
| 1000000 | 80000000 | 80 |
| 900000 | 72000000 | 80 |
| 800000 | 64000000 | 80 |

FIG. 4A

| CPU_Freq(Hz) | Up-Threshold | OFSL Ratio |
|---|---|---|
| 1300000 | 118700000 | 91.31 |
| 1200000 | 108800000 | 90.67 |
| 1100000 | 98900000 | 89.91 |
| 1000000 | 89000000 | 89.00 |
| 900000 | 79100000 | 87.89 |
| 800000 | 69200000 | 86.50 |

FIG. 4B

| CPU_Freq(Hz) | Down-Threshold | OFSL Ratio |
|---|---|---|
| 1300000 | 107000000 | 82.31 |
| 1200000 | 98000000 | 81.67 |
| 1100000 | 89000000 | 80.91 |
| 1000000 | 80000000 | 80 |
| 900000 | 71000000 | 78.89 |
| 800000 | 62000000 | 77.50 |

FIG. 8A

| CPU_Freq(Hz) | Up-Threshold | OFSL Ratio |
|---|---|---|
| 1300000 | 119600000 | 92 |
| 1200000 | 110400000 | 92 |
| 1100000 | 101200000 | 92 |
| 1000000 | 92000000 | 92 |
| 900000 | 82800000 | 92 |
| 800000 | 73600000 | 92 |

FIG. 8B

| CPU_Freq(Hz) | Up-Threshold | OFSL Ratio |
|---|---|---|
| 1300000 | 114400000 | 88 |
| 1200000 | 105600000 | 88 |
| 1100000 | 96800000 | 88 |
| 1000000 | 88000000 | 88 |
| 900000 | 79200000 | 88 |
| 800000 | 70400000 | 88 |

FIG. 9A

| CPU_Freq(Hz) | Down-Threshold | OFSL Ratio |
|---|---|---|
| 1300000 | 106600000 | 82 |
| 1200000 | 98400000 | 82 |
| 1100000 | 90200000 | 82 |
| 1000000 | 82000000 | 82 |
| 900000 | 73800000 | 82 |
| 800000 | 65600000 | 82 |

FIG. 9B

| CPU_Freq(Hz) | Down-Threshold | OFSL Ratio |
|---|---|---|
| 1300000 | 101400000 | 78 |
| 1200000 | 93600000 | 78 |
| 1100000 | 85800000 | 78 |
| 1000000 | 78000000 | 78 |
| 900000 | 70200000 | 78 |
| 800000 | 62400000 | 78 |

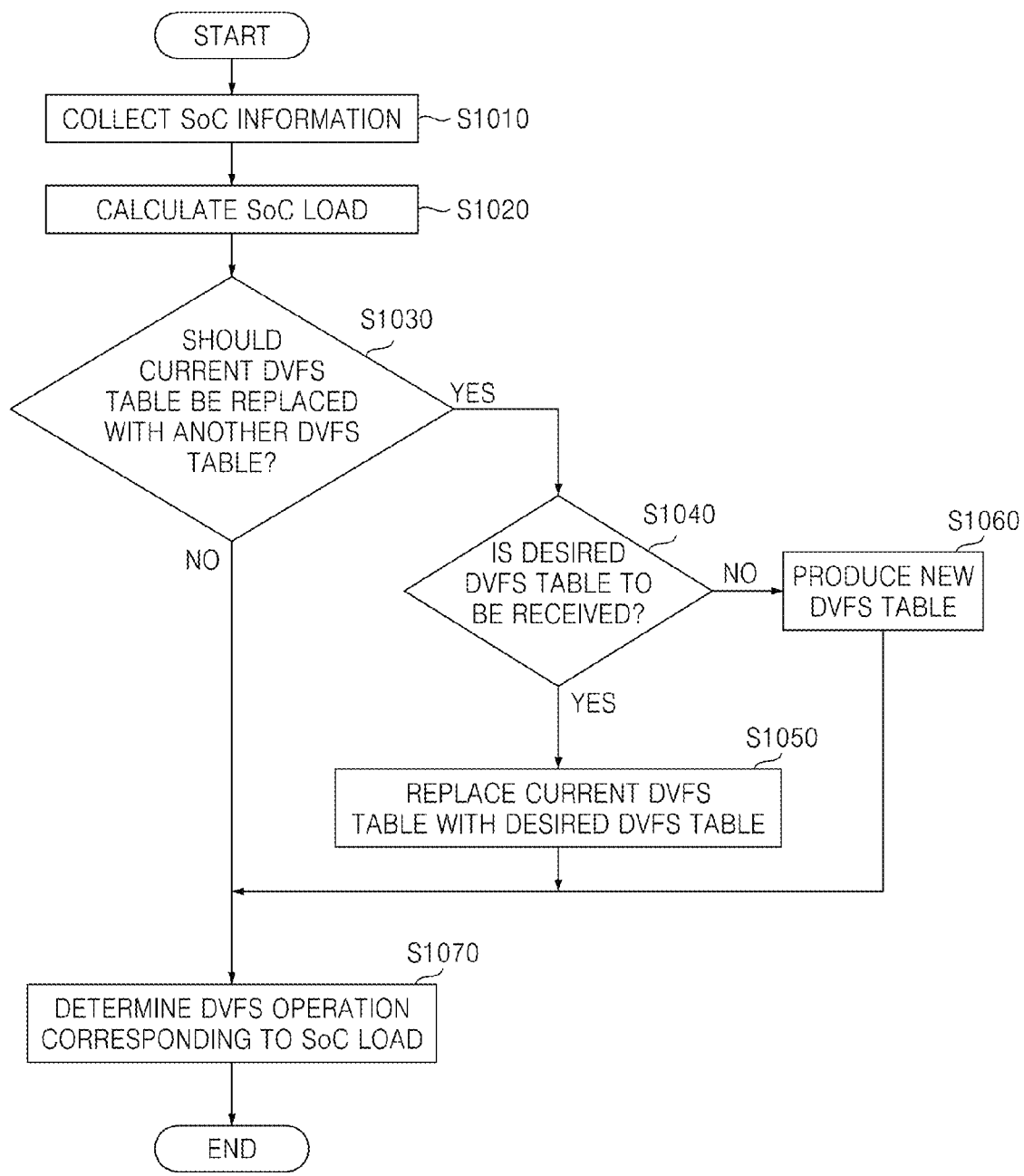

DYNAMIC VOLTAGE FREQUENCY SCALING METHOD AND APPARATUS

CROSS-REFERENCE TO RELATED APPLICATIONS

This application claims the benefit of Korean Patent Application No. 10-2012-0095142, filed on Aug. 29, 2012, in the Korean Intellectual Property Office, the disclosure of which is incorporated herein in its entirety by reference.

BACKGROUND

Methods and apparatuses in accordance with principles of inventive concepts relate to a dynamic voltage frequency scaling (DVFS) method and apparatus, and more particularly, to a DVFS controlling method for efficiently managing power consumption and performance based a result of analyzing an operational scenario and an apparatus, such as a system on chip (SOC), using the same. By operational scenario we mean the manner in which the system operates, or, simply, operational mode. For example, one operational scenario may be associated with an arbitrary function, such as playing an electronic game. Another operational scenario may be associated with the function of playing a video file. And another operational scenario may be associated with the function of running an arbitrary function, such as playing an electronic game and, concurrently, playing a video file. The operational scenario may provide an indication of the level of power required and whether the power level requirements may fluctuate (and, if so, how much the requirements may fluctuate), for example.

The term "microprocessor" is used, generally, herein to refer to a processing apparatus integrated in a single integrated circuit, or chip, and that systematically performs operations in a preset order under control of microcode.

The term system on a chip (SOC) is used, generally, herein to refer to a processing apparatus that integrates various functional blocks (e.g., a central processing unit (CPU), a memory, an interface unit, a digital signal processing circuit, an analog signal processing circuit, etc.) in a single, or few, semiconductor integrated circuits (ICs) to realize an electronic system, such as a computer system, using a limited number of integrated circuits. An SOC may include various functions, such as a processor function, a multimedia function, a graphic function, an interface function, and a security function, for example.

Power consumption in electronic devices may have a variety of negative effects. For example, operating temperatures may rise, thereby reducing reliability; operating life, such as associated with a limited power source such as a battery, may be reduced, and additional equipment and/or structures may be required to dissipate heat. Concerns related to power consumption may be especially acute in highly-integrated electronic systems, such as an SOC, for example, particularly in applications where the SOC is employed as an element of a portable, battery-powered system. In order to address such negative consequences, an electronic system may employ a dynamic voltage frequency scaling process whereby power consumption is managed in order to provide a desirable level of performance while limiting power consumption.

SUMMARY

In exemplary embodiments in accordance with principles of inventive concepts a system-on chip (SOC) includes a central processing unit (CPU) to operate a dynamic voltage frequency scaling (DVFS) control unit, the DVFS control unit include a SOC load calculating unit to calculate a SOC load based on at least one element of the SOC, a DVFS table selecting unit for determining a scenario of a CPU operation based on a result of analyzing a pattern of the SOC load or according to an external input, and determining a DVFS table suitable for the scenario; and a DVFS calculating unit for determining a DVFS operation corresponding to the SOC load and a current operating frequency, based on the determined DVFS table among a plurality of DVFS tables.

In an exemplary embodiment in accordance with principles of inventive concepts, a DVFS control unit further comprises a DVFS table storing unit for storing the plurality of DVFS tables and providing the plurality of DVFS tables to the DVFS table selecting unit.

In an exemplary embodiment in accordance with principles of inventive concepts, the plurality of DVFS tables comprise up-thresholds corresponding to operating frequencies of the CPU, wherein in some of the plurality of DVFS tables, ratios between the operating frequencies and the up-thresholds vary according to the operating frequencies.

In an exemplary embodiment in accordance with principles of inventive concepts, the plurality of DVFS tables comprise down-thresholds corresponding to operating frequencies of the CPU, wherein in some of the plurality of DVFS tables, ratios between the operating frequencies and the down-thresholds vary according to the operating frequencies.

In an exemplary embodiment in accordance with principles of inventive concepts, the external input comprises application execution information and a CPU control signal.

In an exemplary embodiment in accordance with principles of inventive concepts, the DVFS table selecting unit determines a DVFS table suitable for the scenario by selecting at least one of the plurality of DVFS tables.

In an exemplary embodiment in accordance with principles of inventive concepts, the DVFS operation comprises a first policy and a second policy, wherein the first policy increases the operating frequency of the CPU and an operating voltage of the SOC and the second policy decreases the operating frequency of the CPU and the operating voltage of the SOC.

In an exemplary embodiment in accordance with principles of inventive concepts, includes a performance monitoring unit for measuring the memory usage of at least one of the elements of the SOC and transmitting information regarding the memory usage to the DVFS control unit; and a clock management unit for changing an operating frequency of the CPU to perform the DVFS operation, under control of the DVFS control unit.

In an exemplary embodiment in accordance with principles of inventive concepts, an electronic system includes the SOC and a power management integrated circuit for generating an operating voltage of the SOC and applying the operating voltage to the SOC so as to perform a dynamic voltage frequency scaling (DVFS) operation.

In an exemplary embodiment in accordance with principles of inventive concepts a dynamic voltage frequency scaling (DVFS) controlling method includes calculating a system-on chip (SOC) load on at least one of elements of a SOC, determining a scenario of a central processing unit (CPU), based on analyzing a pattern of the SOC load or according to an external input, determining whether a current DVFS table is to be replaced with another DVFS table depending on the scenario, and determining a DVFS operation corresponding to the SOC load and an operating frequency of the CPU, based on the current DVFS table or a replaced DVFS table.

In an exemplary embodiment in accordance with principles of inventive concepts, the method includes, if it is determined that the current DVFS table is to be replaced with another DVFS table, further including determining a DVFS table suitable for the scenario by selecting at least one of a plurality of DVFS tables.

The exemplary embodiment of a method in accordance with principles of inventive concepts, further includes wherein the plurality of DVFS tables comprise up-thresholds corresponding to operating frequencies of the CPU, and in some of the plurality of DVFS tables, ratios between the operating frequencies and the up-thresholds vary according to the operating frequencies.

In an exemplary embodiment in accordance with principles of inventive concepts, the method further includes wherein the plurality of DVFS tables comprise down-thresholds corresponding to operating frequencies of the CPU, and in some of the plurality of DVFS tables, ratios between the operating frequencies and the down-thresholds vary according to the operating frequencies.

In an exemplary embodiment in accordance with principles of inventive concepts, the method further includes, wherein the external input comprises application execution information and a CPU control signal.

In an exemplary embodiment in accordance with principles of inventive concepts, the method further includes wherein the DVFS operation comprises a first policy and a second policy, wherein the first policy instructs to increase an operating frequency of CPU and an operating voltage of the SOC, and the second policy instructs to decrease the operating frequency of the CPU and the operating voltage of the SOC.

In an exemplary embodiment in accordance with principles of inventive concepts, a system on a chip (SOC) includes a multi-core processor, system elements, and a dynamic voltage frequency scaling (DVFS) controller, the DVFS controller to allot greater or lesser power to the SOC depending upon the SOC's mode of operation and current operating frequency, wherein the DVFS controller is configured to determine the mode of operation by analyzing system activity and to allot greater or lesser power according to one or more DVFS tables.

In an exemplary embodiment in accordance with principles of inventive concepts, the DFVS controller is configured to allot greater or lesser power by adjusting an operating frequency.

In an exemplary embodiment in accordance with principles of inventive concepts, the DVFS controller is configured to allot greater or lesser power by adjusting an operating voltage.

In an exemplary embodiment in accordance with principles of inventive concepts, the DVFS controller is configured to allot greater or lesser power by adjusting an operating voltage and frequency for a plurality of the cores of the multicore processor.

In an exemplary embodiment in accordance with principles of inventive concepts, an electronic system includes an SOC that includes a multi-core processor, system elements, and a dynamic voltage frequency scaling (DVFS) controller, the DVFS controller to allot greater or lesser power to the SOC depending upon the SOC's mode of operation and current operating frequency, wherein the DVFS controller is configured to determine the mode of operation by analyzing system activity and to allot greater or lesser power according to one or more DVFS tables.

BRIEF DESCRIPTION OF THE DRAWINGS

Exemplary embodiments of inventive concepts will be more clearly understood from the following detailed description taken in conjunction with the accompanying drawings in which:

FIGS. 3A and 3B illustrate parts of a DVFS table in which a ratio between each of operating frequencies and a system-on chip (SOC) load (OFSL ratio) is the same with respect to each of the operating frequencies;

FIGS. 4A and 4B illustrate parts of a DVFS table in which a ratio between each of the operating frequencies and a SOC load (OFSL ratio) is different with respect to each of the operating frequencies;

FIGS. 8A and 8B are parts of a DVFS table that is a modified example of the DVFS table of FIG. 3A, in which the ratio between each of operating frequencies and a SOC load (OFSL ratio) is modified;

FIGS. 9A and 9B are parts of a DVFS table that is a modified example of the DVFS table of FIG. 3B, in which the ratio between each of operating frequencies and a SOC load (OFSL ratio) is modified;

FIG. 10 is a flowchart illustrating a DVFS operation performed by a DVFS control unit according to another embodiment of the inventive concept;

DETAILED DESCRIPTION OF THE EMBODIMENTS

Figure 1:
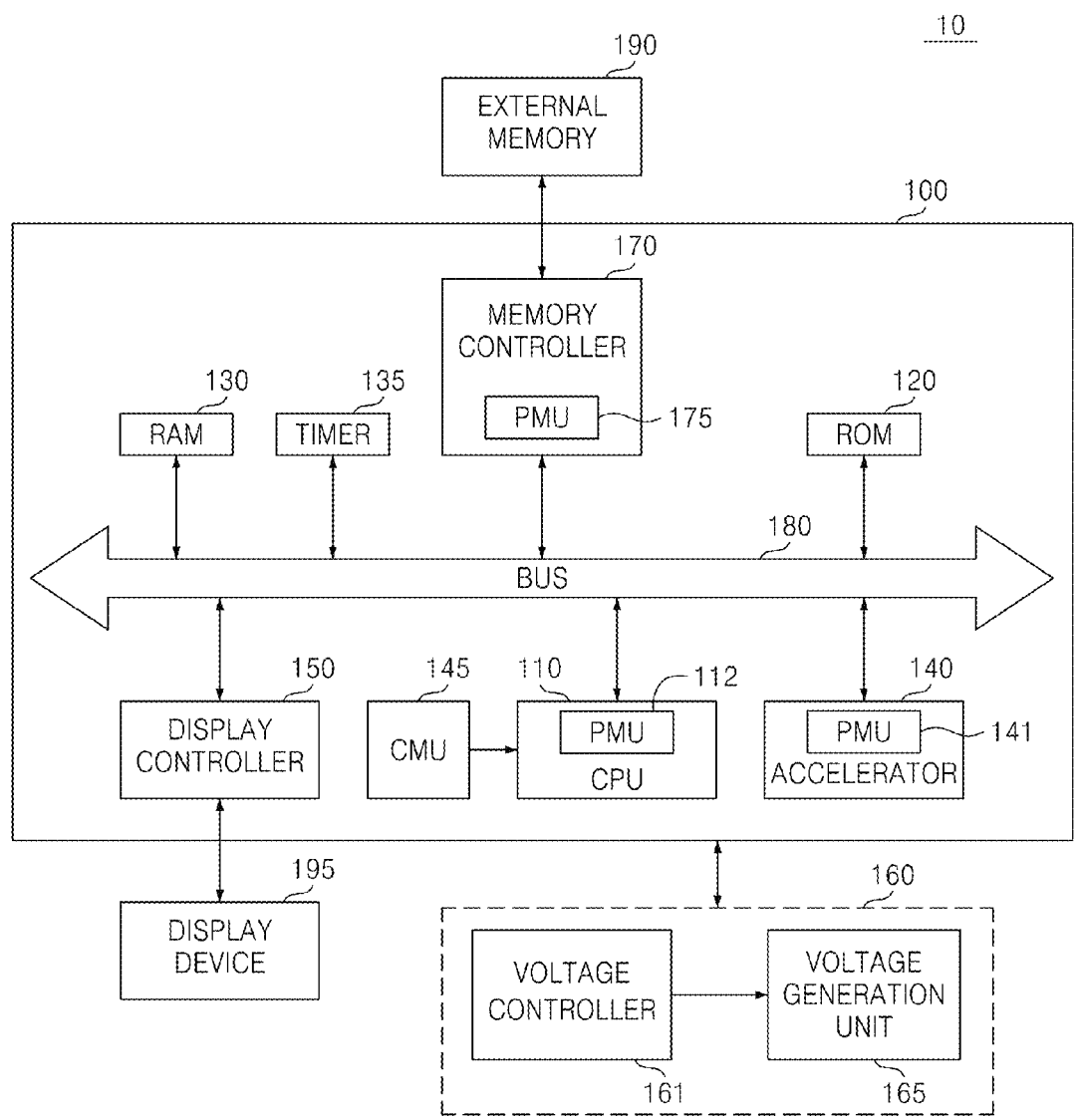
FIG. 1 is a block diagram of an electronic system in accordance with principles of inventive concepts.

Exemplary embodiments in accordance with principles of inventive concepts will now be described more fully with reference to the accompanying drawings, in which exemplary embodiments are shown. Exemplary embodiments in accordance with principles of inventive concepts may, however, be embodied in many different forms and should not be construed as being limited to the embodiments set forth herein; rather, these embodiments are provided so that this disclosure will be thorough and complete, and will fully convey the concept of exemplary embodiments to those of ordinary skill in the art. In the drawings, the thicknesses of layers and regions may be exaggerated for clarity. Like reference numerals in the drawings denote like elements, and thus their description may not be repeated.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on"). The word "or" is used in an inclusive sense, unless otherwise indicated.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of exemplary embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "bottom," "below," "lower," or "beneath" other elements or features would then be oriented "atop," or "above," the other elements or features. Thus, the exemplary terms "bottom," or "below" can encompass both an orientation of above and below, top and bottom. The device may be otherwise oriented (rotated 90 degrees or at other orientations) and the spatially relative descriptors used herein interpreted accordingly.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Exemplary embodiments in accordance with principles of inventive concepts are described herein with reference to cross-sectional illustrations that are schematic illustrations of idealized embodiments (and intermediate structures) of exemplary embodiments. As such, variations from the shapes of the illustrations as a result, for example, of manufacturing techniques and/or tolerances, are to be expected. Thus, exemplary embodiments in accordance with principles of inventive concepts should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of exemplary embodiments.

Unless otherwise defined, all terms (including technical and scientific terms) used herein have the same meaning as commonly understood by one of ordinary skill in the art to which exemplary embodiments in accordance with principles of inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a block diagram of an exemplary embodiment of an electronic system 10 in accordance with principles of inventive concepts.

Referring to FIG. 1, an electronic system 10 in accordance with principles of inventive concepts may be embodied as a handheld device, such as a mobile phone, a smart phone, a tablet computer, a personal digital assistant (PDA), an enterprise digital assistant (EDA), a digital still camera, a digital video camera, a portable multimedia player (PMP), a personal navigation device or portable navigation device (PND), a handheld game console, or an e-book reader, for example.

In this exemplary embodiment electronic system 10 includes a system on chip (SOC) 100, a memory device 190, and a display device 195. The SOC 100 may include a central processing unit (CPU) 110, a read only memory (ROM) 120, a random access memory (RAM) 130, a timer 135, an accelerator 140, a clock management unit (CMU) 145, a display controller 150, a memory controller 170, and a bus 180. Although not shown, the SOC 100 may include other devices such as a television (TV) processor, for example. The electronic system 10 may further include a power management integrated circuit (PMIC) 160.

In the exemplary embodiment of FIG. 1, the PMIC 160 is installed outside the SOC 100 but may be installed inside the SOC 100 according to another exemplary embodiment in accordance with principles of inventive concepts. The PMIC 160 may include a voltage control unit 161 and a voltage generation unit 165.

The CPU 110 (also referred to herein as a processor) may process or execute programs and/or data stored in the memory device 190. For example, the CPU 110 may process or execute the programs and/or the data at a rate that is, at least partially, controlled by a clock signal received from a clock signal generator (not shown).

In an exemplary embodiment in accordance with principles of inventive concepts CPU 110 may be embodied as a multi-core processor, for example. By multi-core processor we mean one computing component that includes at least two processors (referred to as cores) that are capable of reading and performing program instructions. In an exemplary embodiment in accordance with principles of inventive concepts the multi-core processor is capable of simultaneously driving a plurality of accelerators, and, as a result, a data processing system including the multi-core processor may perform multi-acceleration.

In an exemplary embodiment in accordance with principles of inventive concepts electronic system 10 may include a performance monitoring unit (PMU) 112, which may be installed inside of, or at a front end of, the CPU 110, for example.

Programs and/or data stored in the ROM 120, the RAM 130, and the memory device 190 may be loaded to a memory of the CPU 110 if needed. The ROM 120 may store permanent programs and/or data. The ROM 120 may be embodied as an erasable programmable read-only memory (EPROM) or an electrically erasable programmable read-only memory (EEPROM), for example.

The RAM 130 may temporarily store programs, data, or instructions. For example, programs and/or data stored in the memory 120 or the memory device 190 may be temporarily stored in the RAM 130 under control of the CPU 110 or according to booting code stored in the ROM 120. RAM 130 may be embodied as a dynamic RAM (DRAM) or a static RAM (SRAM), for example.

In an exemplary embodiment in accordance with principles of inventive concepts, accelerator 140 may be a co-processor, an application-specific integrated circuit, and may include firmware, machine code, and/or hardware elements for enhancing the performance of system 10 in any of a variety of ways, including in the processing of multimedia or multimedia data such as text, audio, still images, animation, video, two-dimensional (2D) data, or three-dimensional (3D) data, for example.

Although, for convenience and clarity of explanation, FIG. 1 illustrates only one accelerator 140, the SOC 100 may include more than one accelerator in an exemplary embodiment in accordance with principles of inventive concepts. For example, at least one application program may run one accelerator.

In an exemplary embodiment in accordance with principles of inventive concepts, a PMU 141 may be installed inside of, or at a front end of, the accelerator 140. The PMU 141 is a module configured to measure the performance of the accelerator 141, and in an exemplary embodiment in accordance with principles of inventive concepts, the PMU 141 may measure the amount of data input to or output from the accelerator 141, and measure the accelerator's 141 memory usage.

In an exemplary embodiment in accordance with principles of inventive concepts, CMU 145, which may be a clock generation device including a phase locked loop (PLL), a delayed locked loop (DLL), and a crystal modifier, generates an operating clock signal which may be supplied to the CPU 110. The operating clock signal may also be supplied to another device such as, for example, memory controller 170.

In an exemplary embodiment in accordance with principles of inventive concepts, CMU 145 may change a frequency of the operating clock signal under control of the DVFS control unit 200, as will be described in greater detail in the discussion related to FIG. 2. For example, the DVFS control unit 200 may select one of a plurality of dynamic power management (DPM) policies that are preset based on SOC information collected using software, firmware, hardware, or a combination of any of these. By "DPM policy," we mean a process, or combination of processes, for controlling power consumption that may include: increasing operating voltage and/or operating frequency, decreasing operating voltage and/or operating frequency, also referred to herein as dynamic voltage frequency scaling (DVFS). A DPM policy may also include dynamic power shutdown (DPS), whereby power may shutdown, for example, to a standby level when, for example, one or more system components may overheat. Under a DVFS policy a DVFS controller in accordance with principles of inventive concepts may increase operating voltage and/or frequency, thereby increasing power consumption, when it is necessary to increase performance or reduce operating voltage and/or frequency, thereby reducing power consumption when reduced power consumption is of greater importance than system performance. The DVFS control unit 200 may control the CMU 145 according to the selected process. Thus, the CMU 145 may change the frequency of the operating clock signal according to the selected policy (e.g., a first policy or a second policy), under control of the DVFS control unit 200.

In an exemplary embodiment in accordance with principles of inventive concepts, the first policy may emphasize the processing performance of the SOC 100 and, in particular, the CPU 110, by increasing an operating frequency and operating voltage thereof. In contrast, the second policy may emphasize a reduction in power consumption of the SOC 100 by reducing the operating frequency and operating voltage thereof.

Depending upon various factors, such as the type of operation being performed, the program being executed, or the type of auxiliary device the CPU 110 may be operating in concert with, processing performance may be more important than power conservation, or, for other operations, power conservation may be more important than processing power. Accordingly, the DVFS control unit 200 may improve system performance while reducing power consumption by appropriately selecting the first policy and the second policy, for example, in a predetermined cycle.

In accordance with principles of inventive concepts, the voltage control unit 161 may control the voltage generation unit 165 based on a policy, for example, the first or second policy, selected by the DVFS control unit 200. The voltage generation unit 165 may generate an operating voltage for the SOC 100 and apply the operating voltage to the SOC 100, with the value of the operating voltage based on the selected first or second policy, under control of the voltage control unit 161.

The memory controller 170 is a block for interfacing with the memory device 190. In an exemplary embodiment in accordance with principles of inventive concepts, memory controller 170 controls overall operations of the memory device 190, and controls exchange of various data between a host (not shown) and the memory device 190. For example, the memory controller 170 may control the memory controller 170 to write data to or read data from the memory device 190, in response to a request from the host. The host may be a master device, such as the CPU 110, the accelerator 140, or the display controller 150, for example.

The memory device 190 may store an operating system (OS), various programs, and various data. The memory device 190 may be a DRAM but is not limited thereto. For example, the memory device 190 may be a nonvolatile memory device, e.g., a flash memory, a phase-change RAM (PRAM), a magneto-resistive RAM (MRAM), a resistive RAM (ReRAM), or a ferroelectric RAM (FeRAM). According to another exemplary embodiment in accordance with principles of inventive concepts, the memory device 190 may be a built-in memory installed in the SOC 100. The devices 110 to 150 and 170 of the SOC 100 may communicate with one another via the bus 180.

The display device 195 may display multimedia accelerated or processed by either a software accelerator loaded to the CPU 110 or the accelerator 140. The display device 195 may be a light-emitting diode (LED), an organic LED (OLED) device, or another device. The display controller 150 controls operations of the display device 195.

The memory controller 170 may include a PMU 175.

The PMUs 112, 141, and 175 may each measure the number of accesses are executed to the memory device 190. That is, in an exemplary embodiment in accordance with principles of inventive concepts, the PMUs 112, 141, and 175 may each measure memory usages of the CPU 110, the accelerator 140, and an auxiliary device (not shown) that access the memory device 190.

In an exemplary embodiment in accordance with principles of inventive concepts, information regarding the memory usages measured by the PMUs 112, 141, and 175 is delivered to the DVFS control unit 200, and the DVFS control unit 200 may control the PMIC 160 to perform the first policy, placing priority to system performance, or the second policy, placing priority to low power consumption, based on the memory usages, for example.

As illustrated in FIG. 1, the SOC 100 may include a plurality of PMUs, e.g., the PMUs 112, 141, and 175. In an exemplary embodiment in accordance with principles of inventive concepts, the plurality of PMUs may be installed inside of, or at front ends of, the devices 110, 140, 150, 170, etc. that access the memory device 190, respectively. In exemplary embodiments in accordance with principles of inventive concepts in which the SOC 100 may include a plurality of PMUs, e.g., the PMUs 112, 141, and 175, the DVFS control unit 200 may select one of a plurality of policies, based on a measurement result of at least one among the PMUs 112, 141, and 175. That is, the DVFS control unit 200 may select a policy based on measurement results of the PMUs 112, 141, and 175 and/or SOC information collected through a higher level program or process, or may select a policy based on a measurement result obtained by selectively driving at least one among the PMUs 112, 141, and 175.

In exemplary embodiments in accordance with principles of inventive concepts in which the SOC 100 may include a plurality of PMUs, e.g., the PMUs 112, 141, and 175, memory usage may be measured in units of the PMUs 112, 141, and 175. That is, memory usage of each device corresponding to, or associated with, each of the PMUs 112, 141, and 175 may be measured. Such memory usage information may include the amount of data input to the memory device 190, the amount of data output from the memory device 190, or the number of events for accessing the memory device 190, for example, but inventive concepts are not limited thereto. The events for accessing the memory device 190 may include generating a read command for outputting data from the memory device 190 (i.e., a read event), and generating a write command for inputting data to the memory device 190 (i.e., a write event). For example, a memory usage may be measured by counting the number of read events and write events performed on the memory device 190 for a predetermined time period.

Figure 2:
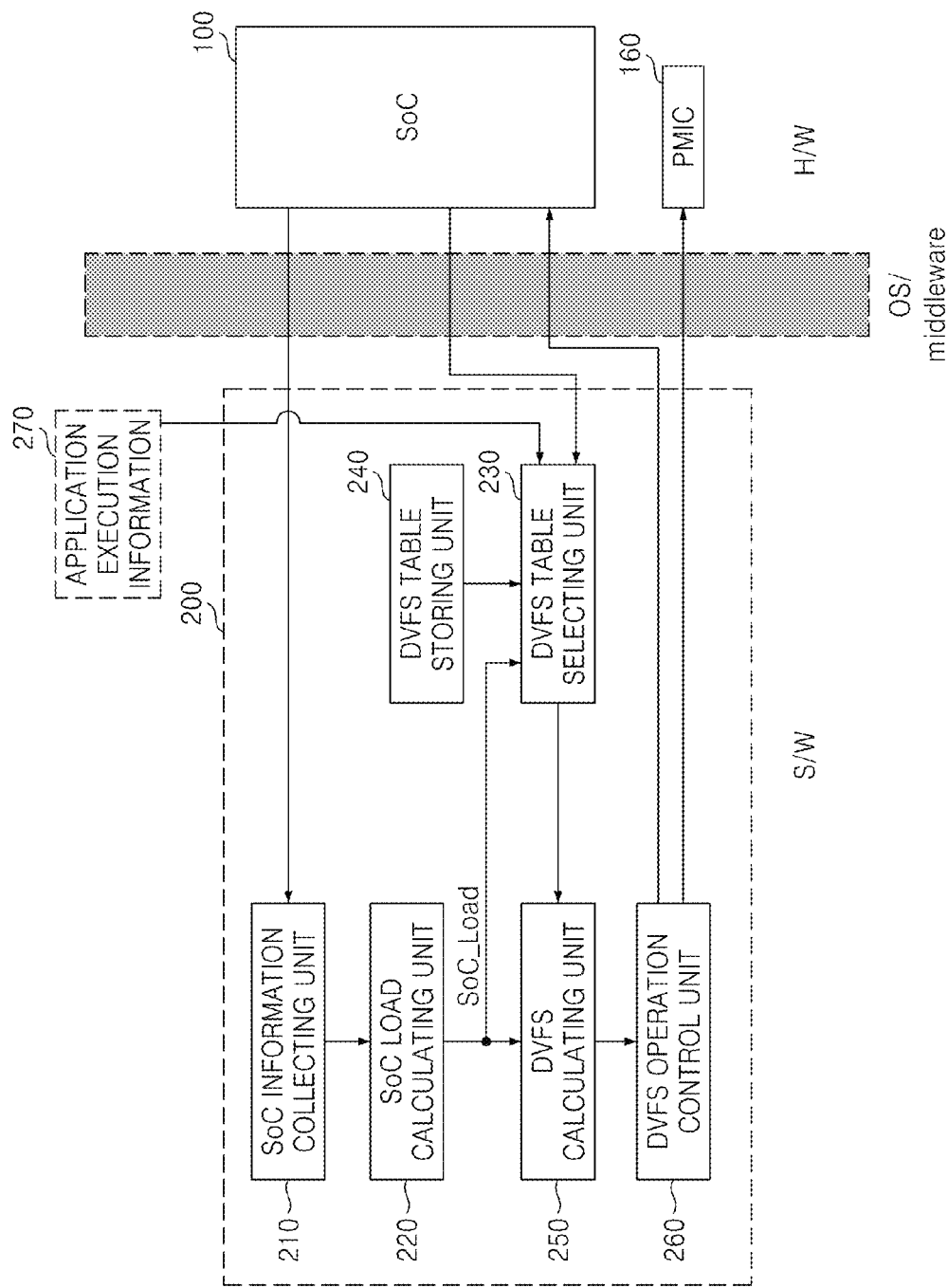
FIG. 2 is a block diagram illustrating a relationship among a dynamic voltage frequency scaling (DVFS) control unit and other devices in accordance with principles of inventive concepts.

FIG. 2 is a block diagram illustrating a relationship among a dynamic voltage frequency scaling (DVFS) control unit 200 and other devices according to an exemplary embodiment in accordance with principles of inventive concepts. Referring to FIG. 2, the DVFS control unit 200 may be embodied as software (S/W), firmware (F/W), configurable logic, applications specific integrated circuit, or other devices or a combination of any of those. The DVFS control unit 200 may be embodied, in part, as a series of instructions, installed into the memory 120, 130, or 190, and operated when the SOC 100 is powered on.

The DVFS control unit 200 may control the memories 120, 130, and 190, the timer 135, the PMUs 112, 141, and 175, the CMU 145, and the PMIC 160. The memories 120, 130, and 190, the timer 135, the PMUs 112, 141, and 175, the CMU 145, and the PMIC 160 may be each embodied as hardware (H/W). An operating system (OS) and middleware may be interposed between the DVFS control unit 200 and the memories 120, 130, and 190, the timer 135, the PMUs 112, 141, and 175, the CMU 145, and the PMIC 160.

In an exemplary embodiment in accordance with principles of inventive concepts, the DVFS control unit 200 may include a SOC information collecting unit 210, a SOC load calculating unit 220, a DVFS table selecting unit 230, a DVFS table storing unit 240, a DVFS calculating unit 250, and a DVFS operation control unit 260. The SOC information collecting unit 210 collects SOC information, which may include a measurement result obtained from at least one among the PMUs 112, 141, and 175 of the SOC 100, a current operating frequency Freq obtained from the CMU 145, and operation information of the SOC 100 obtained through other, higher-level, processes, for example. The SOC information collecting unit 210 may transmit the collected SOC information to the SOC load calculating unit 220 and the DVFS table selecting unit 230.

The SOC load calculating unit 220 may calculate a SOC load on each of the internal elements of the SOC 100, based on the SOC information for example, and provide the SOC load figure to the DVFS calculating unit 250 and the DVFS table selecting unit 230. For example, the SOC load calculating unit 220 may calculate a load load$_{CPU}$ on the CPU 110 based on the measurement result of the PMU 112 of the CPU 110, which is included in the SOC information. The load loadcpu calculated at a specific frequency (CPU Frequency of FIG. 3 or 4) may be compared with Up-Threshold and Down-Threshold values of DVFS tables (FIG. 3 or 4). In accordance with principles of inventive concepts, one approach to quantifying the load of an integrated circuit is to combine some measure of the integrated circuit's duty cycle, with its operating frequency. For example, the load of a CPU load$_{CPU}$ may be given as a percentage of time that the CPU is fully operating (rather than in an "idle state") multiplied by the current operating frequency of the CPU. That is, in an exemplary embodiment in accordance with principles of inventive concepts, the load load$_{CPU}$ on the CPU 110 may be calculated by Equation 1:

$$Load_{CPU} = \frac{Wall_{time} - Idle_{time}}{Wall_{time}} * Freq_{cur} * 100 \qquad \text{[Equation 1]}$$

The load load$_{CPU}$ on the CPU 110 may be a product of a ratio between the operational time (Wall$_{time}$−Idle$_{time}$) and a unit time, and a current operating frequency Freq$_{cur}$. For example, if it is assumed that the current operating frequency Freq$_{cur}$ is 1 MHz, the unit time Wall$_{time}$ is 0.1 msec, and the idle time Idle$_{time}$ is 0.01 msec, then the load load$_{CPU}$ on the CPU 110 may be calculated to be '9000000' according to Equation 1. That is, in this exemplary embodiment, the percentage of time the CPU is operating may be expressed as the amount of time the CPU is operating during a given period of time (Wall$_{time}$–Idle$_{time}$), divided by that given period of time and multiplied by 100. This figure may then be multiplied by the concurrent operating frequency of the CPU to yield a load figure. In accordance with principles of inventive concepts, the CPU load figure may also be used as the SOC load figure and may also be referred to herein as the OFSL ration. The CPU load may be based on information regarding memory usage, as measured by PMU, for example. SOC load may also include memory load (based on information measured by PMU 141), for example. The CPU may be described as "idle" when it is not being used by any program and the state (idle or operating) may be determined based on information regarding memory usage measured by PMU 112, for example.

The DVFS table storing unit 240 may store a plurality of DVFS values which the DVFS control unit 200 may employ to select one of a plurality of DVFS policies to employ. In an exemplary embodiment in accordance with principles of inventive concepts, the DVFS control unit implements one of at least two preset policies: increasing power when an SOC load value exceeds an up-threshold, or decreasing power when an SOC load value falls below a down-threshold. The DVFS table storing unit 240 may store the plurality of DVFS tables in memory 120, 130, or 190, and provide the plurality of DVFS tables DVFS to the table selecting unit 230, in response to a request from the table selecting unit 230. The plurality of DVFS tables may include up-thresholds and a down-thresholds of a SOC load corresponding to each of a plurality of operating frequencies CPU_Freq, and an operating voltage of the SOC 100

In accordance with principles of inventive concepts, the DVFS control unit 200 may initiate a first policy in the SOC 100 and/or the PMIC 160 when the SOC load is greater than the up-threshold, and a second policy when the SOC load is less than the down-threshold. In particular, in exemplary embodiments in accordance principles of inventive concepts, power consumption is increased, by increasing the operating voltage and/or increasing the operational frequency of the CPU and/or other components, when the SOC load exceeds the up-threshold and power consumption is decreased, by decreasing the operating voltage and/or decreasing the operational frequency of the CPU and/or other components, when the SOC falls below the down-threshold.

Methods of generating a DVFS table according to embodiments of the inventive concept will be described in detail with reference to FIGS. 3A through 4B below. FIGS. 3A and 3B illustrate DVFS tables, or segments of exemplary embodiments of DVFS tables which may be combined to form a table, in accordance with principles of inventive concepts. The table, or table segment, of FIG. 3A includes entries for CPU operating frequencies, Up-Thresholds, and ratios of Up-Thresholds of SOC loads to CPU operating frequencies. Up-Thresholds are SOC load levels used in accordance with principles of inventive concepts to trigger an increase in voltage and/or frequency for the entire SOC, for the CPU, or for another component of the SOC. In the exemplary embodiment of FIG. 3A, the ratios of up-threshold SOC loads to CPU frequencies are identical, having a value of 90. The ratios of SOC loads to CPU frequency are referred to herein as OFSL ratios. Similarly, the table, or table segment, of FIG. 3B includes entries for CPU operating frequencies, Down-Thresholds of SOC loads, and ratios of Down-Thresholds of SOC loads to CPU operating frequencies. Down-Thresholds are SOC load levels used in accordance with principles of inventive concepts to trigger a decrease in voltage and/or frequency for the entire SOC, for the CPU, or for another component of the SOC. In the exemplary embodiment of FIG. 3B, the ratios of down-threshold loads to frequencies are identical, having a value of 80. Other frequencies, loads, and OFSL ratios are contemplated within the scope of inventive concepts.

FIGS. 4A and 4B illustrate exemplary embodiments of DVFS tables, or segments of tables, in accordance with principles of inventive concepts. The table, or table segment, of FIG. 4A includes entries for CPU operating frequencies, Up-Thresholds, and ratios of Up-Thresholds of SOC loads to CPU operating frequencies. As previously indicated, Up-Thresholds are SOC load levels used in accordance with principles of inventive concepts to trigger an increase in voltage and/or frequency for the entire SOC, for the CPU, or for another component of the SOC. In the exemplary embodiment of FIG. 4A, the ratios of up-threshold SOC loads to CPU frequencies differ, increasing as the CPU frequency increases. The ratios of SOC loads to CPU frequency are referred to herein as OFSL ratios. Similarly, the table, or table segment, of FIG. 4B includes entries for CPU operating frequencies, Down-Thresholds of SOC loads, and ratios of Down-Thresholds of SOC loads to CPU operating frequencies. As previously indicated, Down-Thresholds are SOC load levels used in accordance with principles of inventive concepts to trigger a decrease in voltage and/or frequency for the entire SOC, for the CPU, or for another component of the SOC. In the exemplary embodiment of FIG. 4B, the ratios of down-threshold loads to frequencies vary, decreasing with decreasing CPU frequency.

In an exemplary embodiment in accordance with principles of inventive concepts, the DVFS tables illustrated in FIGS. 4A and 4B may include up-thresholds and down-thresholds calculated by Equations 2 and 3 below:

$$up\text{-}threshold = \left(\frac{Freq_{cur} - Freq_{diff}}{Freq_{cur}} - \alpha\right) * Freq_{cur} * 100 \quad \text{[Equation 2]}$$

$$down\text{-}threshold = \left(\frac{Freq_{cur} - Freq_{diff}}{Freq_{cur}} - \beta\right) * Freq_{cur} * 100 \quad \text{[Equation 3]}$$

In Equations 2 and 3, a current operating frequency Freq$_{cur}$ denotes each of the operating frequencies CPU_Freq shown in the DVFS tables. A difference frequency Freq$_{diff}$ denotes the difference between each of the operating frequencies CPU_Freq in the table the next CPU frequency listed in the table, (for example, 100000 Hz in FIGS. 4A and 4B). A first tuning point α is '0.01' in FIG. 4A, and a second tuning point β is '0.1' in FIG. 4B. As illustrated in FIGS. 4A and 4B, if a DVFS table is configured such that the ratio between each of the operating frequencies CPU_Freq and the SOC load (OFSL ratio) is different with respect to each of the operating frequencies CPU_Freq, then an electronic system, such as an SOC, may be controlled according to the relative importance of power consumption or performance (the relative importance determined, as previously noted, by the application being run, by power reserves, by co-processor demands, or other such factors).

If, for example, a reduction in power consumption were more important than increased performance, the OFSL ratio may increase with increasing frequency, resulting in greater increments in up-threshold SOC load values for each increase in CPU frequency, when compared to increments in up-threshold increments obtained using a single OFSL ratio substantially equal to the midrange of OFSL ratios used in the increasing OFSL ratio embodiment. In such a situation, greater increases in SOC load would be required for the DVFS system to trigger an increase in power (that is, increase the operating frequency and/or voltage of one or more components), thereby allowing the DVFS system to curtail the growth in power consumption at higher frequencies. At lower frequencies, the SOC load up-threshold is decreased (compared to the fixed-OFSL ratio case), and, as a result, the DVFS system will increase power to the system at a lower load trigger when operating at a lower frequency. On the other hand, if increased performance were more important, the DVFS system may employ decreasing OFSL ratios, with, for example, a table such as that of FIG. 4A having smaller OFSL values (and corresponding decreasing steps in SOC load up-threshold increments) as CPU frequencies increased.

Similarly, regarding SOC load down-thresholds, if a reduction in power consumption were more important than increased performance, the OFSL ratio may increase with increasing frequency, resulting in greater increments in down-threshold SOC load values for each increase in CPU frequency, when compared to increments in up-threshold increments obtained using a single OFSL ratio substantially equal to the midrange of OFSL ratios used in the increasing OFSL ratio embodiment. In such a situation, greater increases in SOC load would be required for the DVFS system to trigger an increase in power (that is, to increase the operating frequency and/or voltage of one or more components), thereby allowing the DVFS system to curtail the growth in power consumption at higher frequencies. At lower frequencies, the SOC load down-threshold is decreased (compared to the fixed-OFSL ratio case), and, as a result, the DVFS system will reduce power to the system at a lower SOC load trigger level when operating at a lower frequency. On the other hand, if increased performance were more important, the DVFS system may employ decreasing OFSL ratios, with, for example, a table such as that of FIG. 4A having smaller OFSL values (and corresponding decreasing steps in SOC load up-threshold increments) as CPU frequencies increased.

As illustrated in the table segment of FIG. 4A in an application where it is more important to reduce power consumption (and decrease performance) at higher frequencies and to increase performance (and increase power consumption) at lower frequencies, an increasing OFSL ratio may be employed to generate SOC load up-thresholds. For example, because the OFSL ratio for an up-threshold is higher at a higher frequency (e.g., 91.31 at 1,300,000 Hz versus 86.5 at 800,000 Hz) the DVFS system will not increase power to the system at higher frequencies until the load to the system is at a disproportionately higher level than at a lower frequencies. Similarly, as illustrated in the table segment of FIG. 4B, in an application where it is more important to reduce power consumption (and decrease performance) at higher frequencies and to increase performance (and increase power consumption) at lower frequencies, an increasing OFSL ratio may be employed to generate SOC load down-thresholds. For example, because the OFSL ratio for a down-threshold is higher at a higher frequency (e.g., 82.31 at 1,300,000 Hz versus 77.5 at 800,000 Hz) the DVFS system will decrease power to the system at higher frequencies when the load to the system is at a disproportionately higher level than at a lower frequencies. In accordance with principles of inventive concepts, a ratio between the importance of power consumption and the importance of system performance may be differently determined according to the each of the operating frequencies CPU_Freq. Thus, the DVFS control unit 200 may precisely perform DVFS control according to an operating frequency.

For example, referring to FIG. 4A, since the OFSL ratio for an up-threshold is higher when an operating frequency CPU_Freq is 1300000 Hz (OFSL ratio is '91.31') than when an operating frequency is 800000 Hz (OFSL ratio is '86.50'), a reduction in power consumption may be more important than an improvement in system performance. In contrast, since the OFSL ratio is lower when the operating frequency CPU_Freq is 800000 Hz than when the operating frequency is 1300000 Hz, an improvement in system performance may be important than a reduction in power consumption.

Similarly, referring to FIG. 4B, the higher an operating frequency, the higher the OFSL ratio for a down-threshold. Thus, a reduction in power consumption may be more important than an improvement in system performance. In contrast, the lower an operating frequency, the lower the OFSL ratio for a down-threshold. Thus, an improvement in system performance may be more important than a reduction in power consumption.

In accordance with principles of inventive concepts, when a DVFS table is generated such that the OFSL ratio varies according to an operating frequency, Equations 2 and 3, the first tuning point α, and the second tuning point β are just examples and different equations and other values may be thus used instead.

A DVFS controller in accordance with principles of inventive concepts may respond to external inputs or internal load analysis to implement an appropriate power (that is, voltage and/or frequency) control process. External inputs may be in the form of a signal from the CPU, or signal from an application (which could be conveyed, either directly or indirectly through the CPU, to the DVFS controller), for example. Application execution information 270 may be a signal generated when a particular application, such as a memo pad program, or a game program, is executed and may provide an indication of whether to emphasize processing power or power conservation during execution of the program, for example.

In an exemplary embodiment in accordance with principles of inventive concepts, internal load analysis may entail analyzing a pattern of the SOC load for a period of time. For example, such a pattern may be in the variation of the SOC's load. A high degree of SOC load variability may indicate that performance should be emphasized over power savings and a low degree of SOC load variability may indicate that power savings should emphasized over performance. A DVFS controller in accordance with principles of inventive concepts may select among tables, such as tables 3A through 4B, to implement a power-control policy according to suit a specific load requirement (that is, whether to emphasize performance or power-savings). For example, the DVFS table selecting unit 230 may replace a current DVFS table with a DVFS table in which the ratio between each of operating frequencies and a SOC load (OFSL ratio) is lower with respect to up-thresholds and down-thresholds than in the current DVFS table if performance is at a premium. Alternatively, the DVFS table selecting unit 230 may replace the current DVFS table with a DVFS table in which the ratio between each of operating frequencies and the SOC load (OFSL ratio) is higher with respect to up-thresholds and down-thresholds than in the current DVFS table if power savings is at a premium.

In accordance with principles of inventive concepts, when the DVFS table selecting unit 230 receives either the application execution information 270 indicating that a memo pad program, or similarly low-performance application, is being executed, or a CPU control signal indicating that the variation in the SOC load is low, the DVFS table selecting unit 230 may employ a table suitable for a low variation in the SOC load, and replace the current DVFS table with a DVFS table in which the ratio between each of operating frequencies and the SOC load (OFSL ratio) is higher with respect to up-thresholds and down-thresholds than in the current DVFS table.

According to an exemplary embodiment in accordance with principles of inventive concepts, the DVFS table selecting unit 230 may replace a current DVFS table in which the OFSL ratio is same with respect to each of the operating frequencies with a DVFS table in which the OFSL ratio varies according to an operating frequency, if needed (e.g., if fine DVSF control is needed according to an operation frequency). In contrast, the DVFS table selecting unit 230 may replace the current DVFS table in which the OFSL ratio varies according to an operating frequency with a DVFS table in which the OFSL ratio is the same with respect to each of the operating frequencies if needed (e.g., if fine DVSF control is not needed according to an operation frequency). Fine DVFS controlled may be employed, for example, in order to vary the sensitivity of Up-Threshold or Down-Threshold to operating frequency. For example, if the CPU frequency is 800,000 and LoadCPU is 70,000,000, DVFS operation control unit 260 will increase operation frequency and voltage in a situation where table 4A is employed, but will not increase operation frequency and voltage in a situation where table 3A is employed. If the CPU frequency is 1,300,000 and LoadCPU is 118,000,000, DVFS operation control unit 260 will not increase operation frequency and operation voltage in a situation where table 4A is employed, but will in a situation where table 3A is employed. So, sensitivity to the operation frequencies is varied according to the operation frequencies by using the DVFS table of FIG. 4. In scenarios that emphasize reducing power consumption at high frequencies and higher performance at lower frequencies, a DVFS table such as that of FIG. 4 may be employed.

That is, the DVFS table selecting unit 230 may select at least one of the plurality of DVFS tables provided from the DVFS table storing unit 240, based on the result of determining the scenario, and transmit the selected DVFS table to the DVFS calculating unit 250.

The DVFS calculating unit 250 may determine a DVFS operation corresponding to the SOC load received from the SOC load calculating unit 220 and a current operating frequency, based on the selected DVFS table received from the DVFS table selecting unit 230. That is, the DVFS calculating unit 250 may compare an up-threshold and a down-threshold for the current operating frequency with the SOC load, and determine a DVFS operation (for example, to increase, decrease, or leave as is, operating voltage and/or frequency) based on the comparison. Then, the DVFS calculating unit 250 may transmit policy information (for example, a first policy to increase performance by increasing operating frequency and/or voltage, or a second policy to preserve power by reducing operating frequency and/or voltage) regarding the determined DVFS operation to the DVFS operation control unit 260.

Assume, for example, that the DVFS table received from the DVFS table selecting unit 230 is as illustrated in FIGS. 3A and 3B and a current operating frequency is 1,100,000 Hz. In such an embodiment, in the DVFS table, the up-threshold and down-threshold are determined to be '99,000,000' and '88,000,000', respectively. Therefore, if a SOC load received from the SOC load calculating unit 220 is '99,500,000', the DVFS calculating unit 250 may transmit policy information corresponding to the first policy for increasing the current operating frequency and operating voltage to the DVFS operation control unit 260. On the other hand, if the SOC load received from the SOC load calculating unit 220 is '87,500,000', the DVFS calculating unit 250 will transmit policy information corresponding to the second policy for decreasing the current operating frequency and operating voltage to the DVFS operation control unit 260. If the SOC load received from the SOC load calculating unit 220 is '90,000,000', the DVFS calculating unit 250 transmits policy information for maintaining the current operating frequency and operating voltage to the DVFS operation control unit 260.

If it is assumed that the DVFS table received from the DVFS table selecting unit 230 is as illustrated in FIGS. 4A and 4B and the current operating frequency is 1,100,000 Hz, in the DVFS table, an up-threshold and a down-threshold are determined to be '98,900,000 and '89,000,000', respectively. Therefore, in this exemplary embodiment in accordance with principles of inventive concepts, if the SOC load received from the SOC load calculating unit 220 is '98,950,000', the DVFS calculating unit 250 may transmit policy information corresponding to the first policy for increasing the current operating frequency and operating voltage to the DVFS operation control unit 260. On the other hand, in this exemplary embodiment, if the SOC load received from the SOC load calculating unit 220 is '88,500,000', the DVFS calculating unit 250 may transmit policy information corresponding to the second policy for decreasing the current operating frequency and operating voltage to the DVFS operation control unit 260. If the SOC load received from the SOC load calculating unit 220 is '90,000,000', the DVFS calculating unit 250 may transmit policy information for maintaining the current operating frequency and operating voltage to the DVFS operation control unit 260.

In an exemplary embodiment in accordance with principles of inventive concepts, if the SOC load is '98,950,000', this corresponds to a case in which the current operating frequency and operating voltage should be maintained when the DVFS table is as illustrated in FIGS. 3A and 3B and corresponds to the first policy when the DVFS table is as illustrated in FIGS. 4A and 4B. Similarly, if the SOC load is '88,500,000', this corresponds to a case in which the current operating frequency and operating voltage should be maintained when the DVFS table is as illustrated in FIGS. 3A and 3B and corresponds to the second policy when the DVFS table is as illustrated in FIGS. 4A and 4B. As described above, when finer DVFS control is to be performed according to an operating frequency if needed, the DVFS table selecting unit 230 may replace a current DVFS table with a DVFS table in which the OFSL ratio varies according to an operating frequency as illustrated in FIGS. 4A and 4B, and provide the replaced DVFS table to the DVFS calculating unit 250.

In an exemplary embodiment in accordance with principles of inventive concepts, the DVFS operation control unit 260 may receive policy information regarding a DVFS operation (indicating whether the current operating frequency and operating voltage should be changed or maintained) from the DVFS calculating unit 250, and control the CMU 145 and the PMIC 160 of the SOC 100. For example, when the DVFS operation control unit 260 receives the first policy or the second policy, the CMU 145 and the PMIC 160 of the SOC 100 may be controlled to increase or decrease the current operating frequency and operating voltage. Additionally, when the DVFS operation control unit 260 receives the policy information for maintaining the current operating frequency and an operating voltage, the CMU 145 and the PMIC 160 of the SOC 100 may be controlled to maintain the current operating frequency and operating voltage.

By using the DVFS control unit 200 in accordance with principles of inventive concepts, DVFS tables may be selectively applied according to any of various load demands, thereby efficiently perform DVFS control.

Additionally, by using the DVFS control unit 200 in accordance with principles of inventive concepts, DVFS tables may be configured such that the OFSL ratio varies according to operating frequency, thereby precisely performing DVFS control according to the operating frequency.

Figure 5:
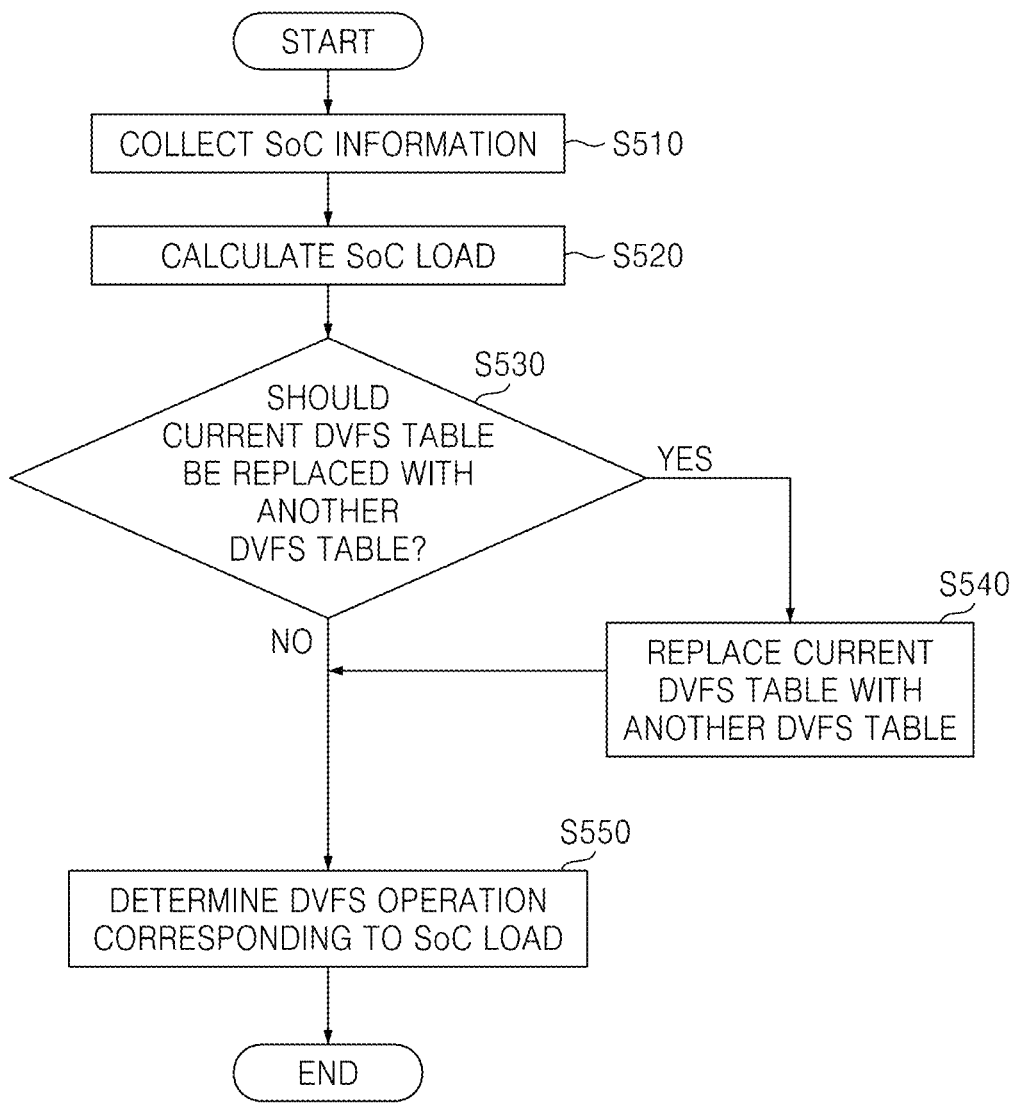
FIG. 5 is a flowchart illustrating a DVFS operation performed by a DVFS control unit in accordance with principles of inventive concepts.
Figure 6:
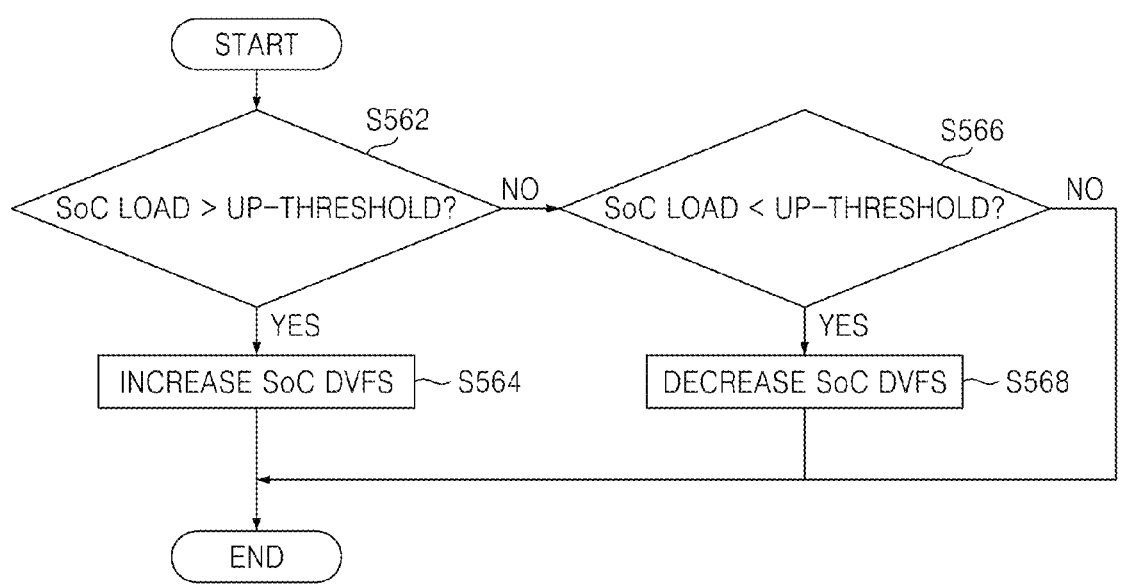
FIG. 6 is a flowchart specifically illustrating an operation of controlling the DVFS operation, which is included in the flowchart of FIG. 5.

FIG. 5 is a flowchart illustrating a DVFS operation performed by the DVFS control unit 200 according to an exemplary embodiment of inventive concepts. FIG. 6 is a flowchart specifically illustrating an operation of controlling the DVFS operation (operation S550), which is included in the flowchart of FIG. 5. Referring to FIGS. 1 to 5, the SOC information collecting unit 210 may collect SOC information and transmit it to the SOC load calculating unit 220 and the DVFS table selecting unit (operation S510).

Then, the SOC load calculating unit 220 may calculate a SOC load on each of the internal elements of the SOC 100, based on the SOC information, and transmit the result to the DVFS calculating unit 250 and the DVFS table selecting unit 230 (operation S520).

The DVFS table selecting unit 230 may determine a scenario, or operational mode, according to a result of analyzing the scenario or an external input, and determine a DVFS table suitable for the scenario.

Then, in accordance with principles of inventive concepts, if the DVFS table selecting unit 230 determines that a current DVFS table is not suitable for the determined scenario and should thus be replaced with another DVFS table ('YES' branch in operation S530), the DVFS table selecting unit 230 may replace the current DVFS table with a DVFS table in which a ratio between operating frequency and a SOC load (OFSL ratio) with respect to an up-threshold and a down-threshold is lower or higher than in the current DVFS table (operation S540), for example. In operation S540, the DVFS table selecting unit 230 may replace the current DVFS table with a DVFS table in which the OFSL ratio varies according to an operating frequency if needed when in the current DVFS table, the OFSL ratio is the same with respect to each of operating frequencies, and may replace the current DVFS table with a DVFS table in which the OFSL ratio is the same with respect to each of operating frequencies if needed when in the current DVFS table, the OFSL ratio varies according to an operating frequency, for example.

The DVFS table selecting unit 230 may transmit the replaced DVFS table to the DVFS calculating unit 250. In accordance with principles of inventive concepts, if the DVFS table selecting unit 230 determines that the current DVFS table is suitable for the determined scenario and thus does not need to be replaced with another DVFS table ('NO' branch in operation S530), then the DVFS table selecting unit 230 may transmit the current DVFS table to the DVFS calculating unit 250.

Then, the DVFS calculating unit 250 may determine a DVFS operation corresponding to the SOC load received from the SOC load calculating unit 220 and a current operating frequency, based on the DVFS table received from the DVFS table selecting unit 230 (operation S550).

Referring to FIG. 6, in accordance with principles of inventive concepts, the DVFS calculating unit 250 may determine whether the SOC load is higher than the up-threshold corresponding to the current operating frequency, based on the DVFS table (operation S562). If the SOC load is higher than the up-threshold ('YES' branch in operation S562), the DVFS calculating unit 250 may transmit policy information corresponding to the first policy to the DVFS operation control unit 260. Then, DVFS operation control unit 260 may receive the policy information, and control the CMU 145 and the PMIC 160 of the SOC 100 to increase the current operating frequency and operating voltage (operation S564), for example.

If the SOC load is lower than the up-threshold ('NO' branch in operation S562), the DVFS calculating unit 250 may determine whether the SOC load is lower than the down-threshold corresponding to the current operating frequency, based on the DVFS table (operation S566).

If the SOC load is lower than the down-threshold ('YES' branch in operation S566), the DVFS calculating unit 250 may transmit policy information corresponding to the second policy to the DVFS operation control unit 260. Then, the DVFS operation control unit 260 may receive the policy information and control the CMU 145 and the PMIC 160 of the SOC 100 to decrease the current operating frequency and operating voltage (operation S568). If the SOC load is higher than the down-threshold ('YES' branch in operation S566), the DVFS calculating unit 250 may transmit policy information for maintaining the current operating frequency and operating voltage to the DVFS operation control unit 260. The DVFS operation control unit 260 may receive the policy information and control the CMU 145 and the PMIC 160 of the SOC 100 to maintain the current operating frequency and operating voltage, for example.

Figure 7:
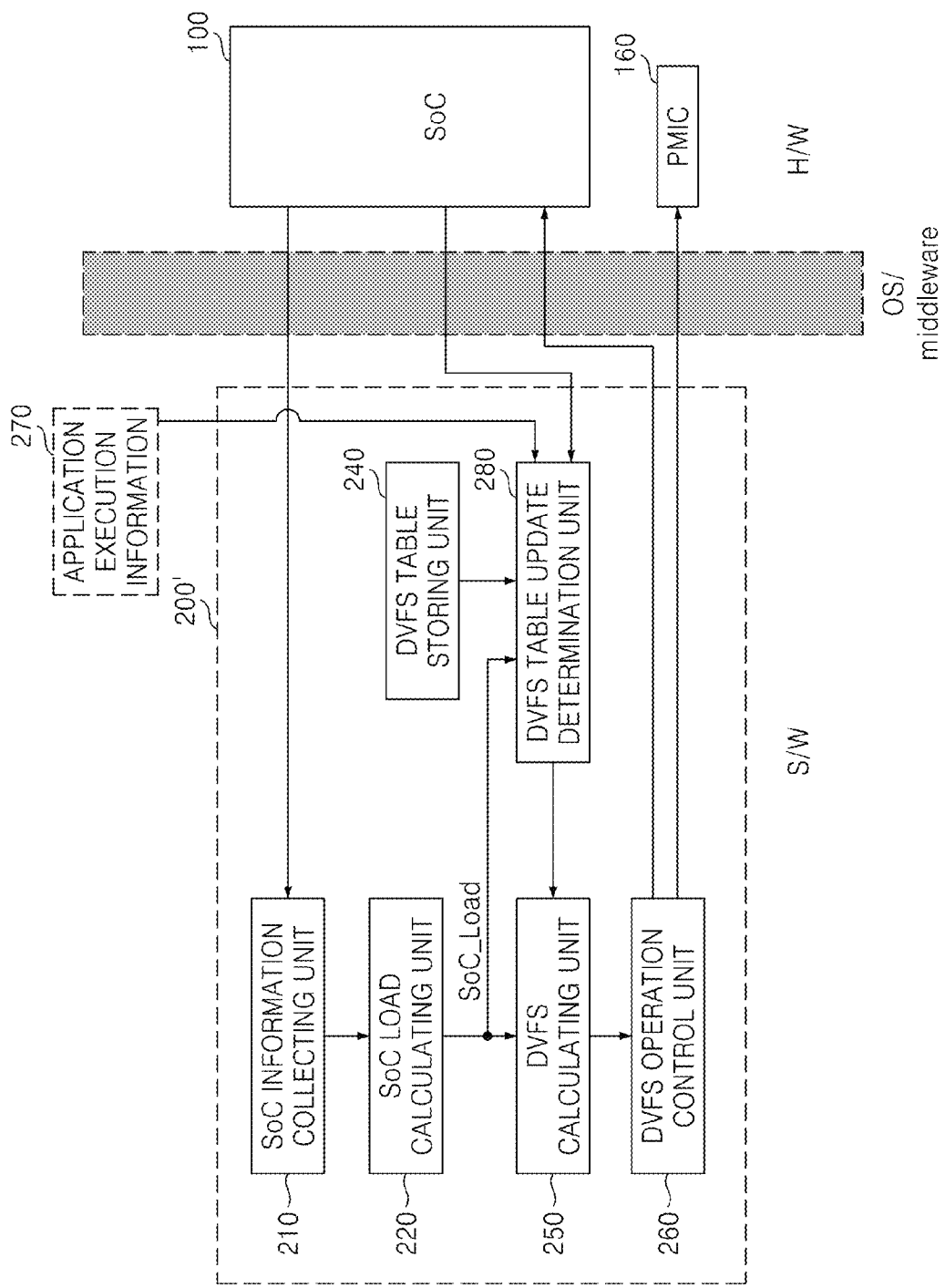
FIG. 7 is a block diagram illustrating a relationship among a DVFS control unit and other devices according to another embodiment of the inventive concept.

FIG. 7 is a block diagram illustrating a relationship between a DVFS control unit 200' and other devices according to another exemplary embodiment in accordance with principles of inventive concepts. FIGS. 8A and 8B are parts of a DVFS table that is a modified example of the DVFS table of FIG. 3A, in which the ratio between each of operating frequencies and a SOC load (OFSL ratio) is modified. FIGS. 9A and 9B are parts of a DVFS table that is a modified example of the DVFS table of FIG. 3B, in which the ratio between each of operating frequencies and a SOC load (OFSL ratio) is modified.

The DVFS control unit 200' according to another embodiment of the inventive concept is similar to the DVFS control unit 200 of FIG. 2 and will thus be described focusing on differences between the DVFS control unit 200' and the DVFS control unit 200 with reference to FIGS. 1 to 4B and 7.

In accordance with principles of inventive concepts a DVFS table update determination unit 280 included in the DVFS control unit 200' may determine a scenario according to a result of analyzing a pattern of a SOC load or an external input, and determine a DVFS table suitable for the scenario. The DVFS table update determination unit 280 may receive the determined DVFS table from a DVFS table storing unit 240, and transmit it to a DVFS calculating unit 250. Additionally, the DVFS table update determination unit 280 may generate a new DFVS table by adjusting ratios between operating frequencies and a SOC load (OFSL ratios), a first tuning point, or a second tuning point included in a current DVFS table. That is, the DVFS table update determination unit 280 may receive a SOC load for a predetermined time period by using a timer 135, calculate a variation in the SOC load to produce a pattern of the SOC load, and analyze the pattern of the SOC load to determine a scenario. Alternatively, the DVFS table update determination unit 280 may determine a scenario according to an external input, i.e., application execution information or a CPU control signal.

As described above with reference to FIG. 2, in accordance with principles of inventive concepts, the scenario may be analyzed as one of various scenarios such as a first scenario to a third scenario. For this exemplary embodiment, it is assumed that the current DVFS table is as illustrated in FIGS. 3A and 3B.

When the DVFS table update determination unit 280 determines the scenario as the first scenario, the DVFS table update determination unit 280 may receive a DVFS table in which ratios between operating frequencies and a SOC load (OFSL ratios) with respect to up-thresholds and down-thresholds are lower than in the current DVFS table, from the DVFS table storing unit 240, and replace the current DVFS table with the received DVFS table. Additionally, if a desired OFSL ratio is '88' (in the DVFS table including the up-thresholds) and is '78' (in the DVFS table including the down-thresholds), the DVFS table update determination unit 280 may produce a DVFS table illustrated in FIGS. 8B and 9B by changing the OFSL ratios included in the current DVFS table.

When the DVFS table update determination unit 280 determines the scenario as the second scenario, the DVFS table update determination unit 280 may receive a DVFS table in which ratios between operating frequencies and a SOC load (OFSL ratios) with respect to up-thresholds and down-thresholds are higher than in the current DVFS table, from the DVFS table storing unit 240, and replace the current DVFS table with the received DVFS table. Also, if a desired OFSL ratio is '92' (in the DVFS table including the up-thresholds) and is '82' (in the DVFS table including the down-thresholds), the DVFS table update determination unit 280 may produce a DVFS table illustrated in FIGS. 8A and 9A by changing the OFSL ratios included in the current DVFS table, for example.

Although the DVFS tables illustrated in FIGS. 8A to 9B have been described above, the inventive concept is not limited thereto and any DVFS tables having various OFSL ratios may be used in accordance with principles of inventive concepts.

According to an exemplary embodiment in accordance with principles of inventive concepts, the DVFS table update determination unit 280 may produce a DVFS table in which the OFSL ratio varies according to operating frequency, for example, based on Equations 2 and 3, or may produce various DVFS tables by adjusting a first tuning point or a second tuning point. In contrast, if, in the current DVFS table, the OFSL ratio varies according to operating frequency, the DVFS table update determination unit 280 may provide a DVFS table such that OFSL ratio is the same with respect to each of operating frequencies, for example.

That is, the DVFS table update determination unit 280 may select at least one of a plurality of DVFS tables provided from the DVFS table storing unit 240 based on the result of determining the scenario or may produce a new DVFS table by adjusting the OFSL ratio, a first tuning point, or a second tuning point, and then transmit the selected or produced DVFS table to the DVFS calculating unit 250.

Figure 11:
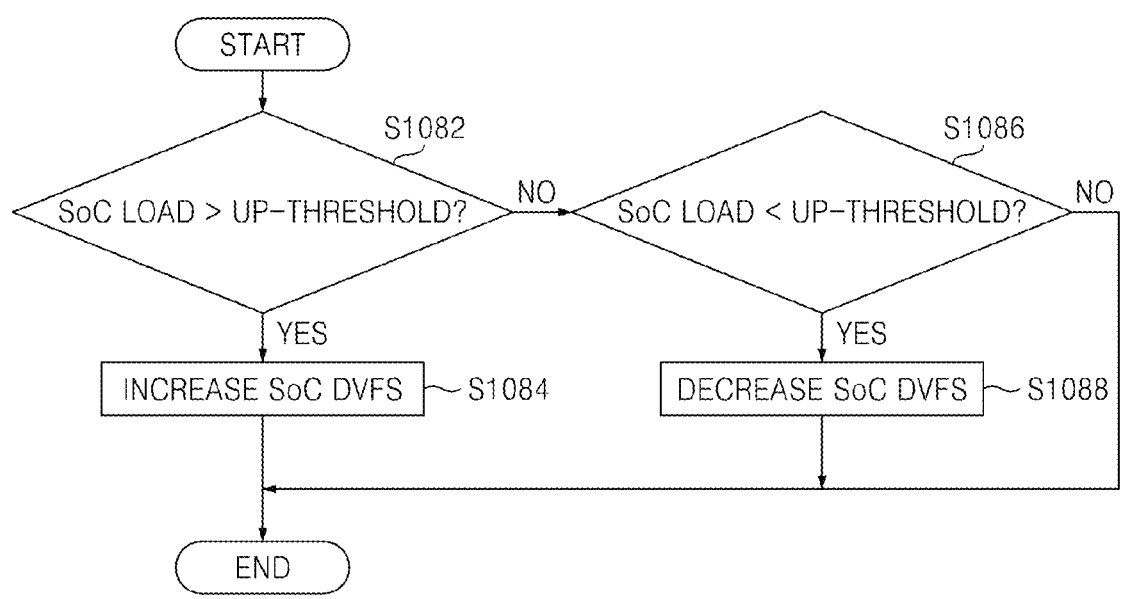
FIG. 11 is a flowchart specifically illustrating an operation of controlling the DVFS operation, which is included in the flowchart of FIG. 10.

FIG. 10 is a flowchart illustrating an exemplary DVFS operation performed by the DVFS control unit 200' in accordance with another embodiment of inventive concepts. FIG. 11 is a flowchart specifically illustrating an operation of controlling the DVFS operation, which is included in the flowchart of FIG. 10. Referring to FIGS. 1 to 11, the SOC information collecting unit 210 may collect SOC information and transmit it to the SOC load calculating unit 220 and the DVFS update determination unit 280 (operation S1010).

Then, the SOC load calculating unit 220 may calculate a SOC load on each of the elements of the SOC 100, based on the SOC information, and transmit a result of calculating the SOC load to the DVFS calculating unit 250 and the DVFS table update determination unit 280 (operation S1020). The DVFS table update determination unit 280 may determine a scenario based on a result of analyzing the scenario or according to an external input, and determine a DVFS table suitable for the scenario, for example.

If it is determined that a current DVFS table is not suitable for the determined scenario and should thus be replaced with another DVFS table ('YES' branch in operation S1030), the DVFS table update determination unit 280 determines whether a desired DVFS table is to be received from the DVFS table storing unit 240 (operation S1040).

If it is determined that the DVFS table update determination unit 280 is to receive the desired DVFS table from the DVFS table storing unit 240 ('YES' branch in operation S1040), the DVFS table update determination unit 280 may receive the desired DVFS table from the DVFS table storing unit 240 and replace the current DVFS table with the desired DVFS table (operation S1050), for example.

In accordance with principles of inventive concepts, if it is determined that the DVFS table update determination unit 280 is not to receive the desired DVFS table from the DVFS table storing unit 240 ('NO' branch in operation S1040), the DVFS table update determination unit 280 may produce a new DVFS table by adjusting ratios between operating frequencies and a SOC load (OFSL ratios), a first tuning point, or a second tuning point included in the current DVFS table (operation S1060).

Then, the DVFS calculating unit 250 may determine a DVFS operation corresponding to the SOC load received from the SOC load calculating unit 220 and a current operating frequency, based on the DVFS table received from the DVFS table update determination unit 280 (operation S1070).

Specific operations (from 1082 to 1088) of the DVFS operation 1070 illustrated in FIG. 11 may be substantially the same as that for specific operations (from 562 to 568) of the DVFS operation 550 illustrated and described in relation to FIG. 6.

By using a DVFS control unit according to exemplary embodiments in accordance with principles of inventive concepts, a DVFS table may be appropriately selected according to any of various scenarios, thereby efficiently performing DVFS control. Using a DVFS control unit according to exemplary embodiments in accordance with principles of inventive concepts, a DVFS table may be configured such that an OFSL ratio varies according to an operating frequency, thereby precisely performing DVFS control according to the operating frequency.

In a conventional DVFS control method, a DVFS table including an up-threshold and a down-threshold with respect to each of operating frequencies is used regardless of a scenario of a CPU operation (e.g., whether a variation in an operating frequency is high or low).

In contrast, in DVFS control method according to exemplary embodiments of inventive concepts, a scenario of a CPU operation may be determined by analyzing a pattern of a SOC load and a plurality of DVFS tables may be selectively used based on the scenario, thereby efficiently performing DVFS control. Additionally, a DVFS table may be configured such that an OFSL ratio (ratio between an operating frequency and an up/low-threshold) varies according to an operating frequency, thereby precisely performing DVFS control according to the operating frequency.

Figure 12:
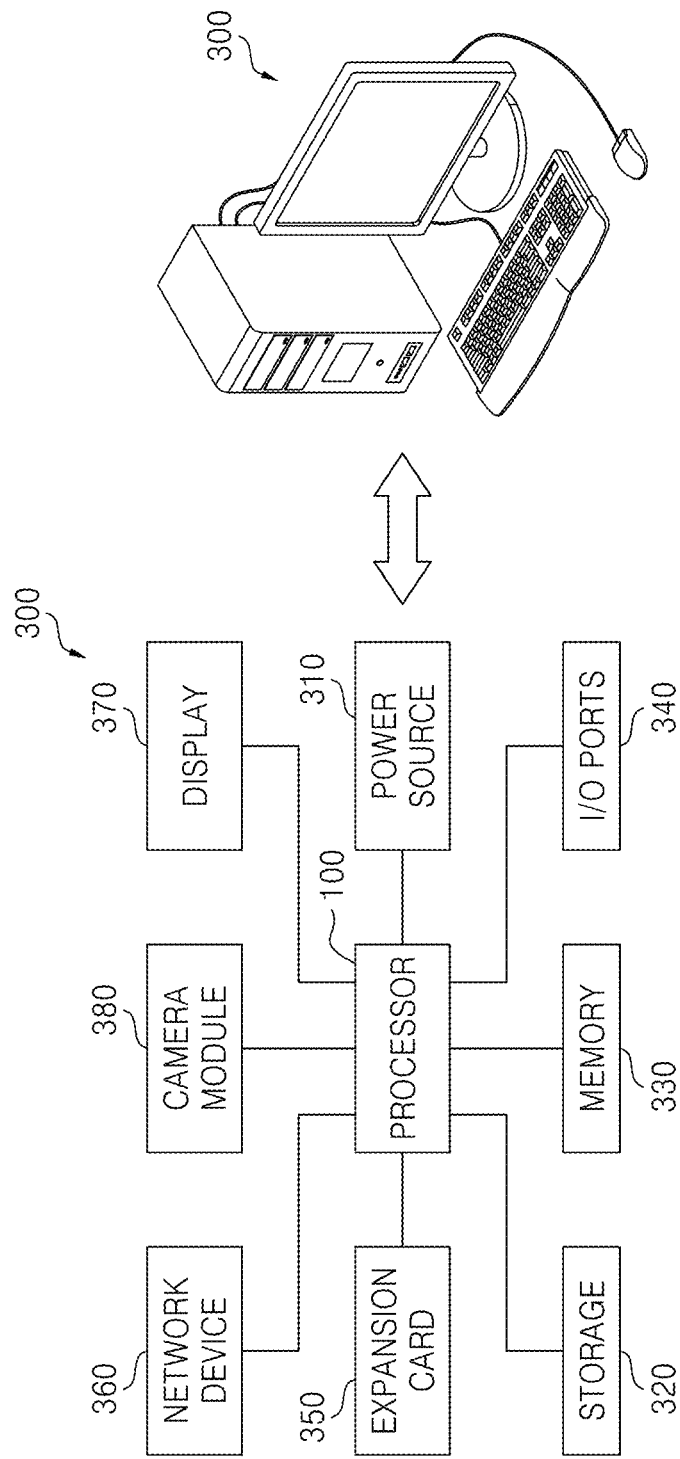
FIG. 12 is a block diagram of an electronic system including the SOC according to other embodiments of the inventive concept.

FIG. 12 is a block diagram of an electronic system 300 including the SOC according to other exemplary embodiments in accordance with principles of inventive concepts. Referring to FIG. 12, the electronic system 300 may be implemented as a PC or a data server, for example.

The electronic system 300 includes the processor 100, a power source 310, a storage device 320, a memory 330, I/O ports 340, an expansion card 350, a network device 360, and a display 370. The electronic system 300 may further include a camera module 380.

The processor 100 may correspond to the SOC 100 illustrated in FIG. 1, for example, and may be a multi-core processor.

The processor 100 may control the operation of at least one of the elements 100, and 310 through 380. The power source 310 may supply an operating voltage to at least one of the elements 100, and 320 through 380. The storage device 320 may be implemented by a hard disk drive (HDD) or a solid state drive (SSD).

The memory 330 may be implemented by a volatile or non-volatile memory. The memory 330 may correspond to the memory device 190 illustrated in FIG. 1. A memory controller (not shown) that controls a data access operation, e.g., a read operation, a write operation (or a program operation), or an erase operation, on the memory 330 may be integrated into or embedded in the processor 100. Alternatively, the memory controller may be provided between the processor 100 and the memory 330.

The I/O ports 340 are ports that receive data transmitted to the electronic system 300 or transmit data from the electronic system 300 to an external device. For instance, the I/O ports 340 may include a port connecting with a pointing device such as a computer mouse, a port connecting with a printer, and a port connecting with a USB drive.

The expansion card 350 may be implemented as a secure digital (SD) card or a multimedia card (MMC) and expansion card 350 may be a subscriber identity module (SIM) card or a universal SIM (USIM) card, for example.

The network device 360 enables the electronic system 300 to be connected with a wired or wireless network. The display 370 displays data output from the storage device 320, the memory 330, the I/O ports 340, the expansion card 350, or the network device 360.

The camera module 380 converts optical images into electrical images. Accordingly, the electrical images output from the camera module 380 may be stored in the storage module 320, the memory 330, or the expansion card 350. Also, the electrical images output from the camera module 380 may be displayed through a display 320.

Figure 13:
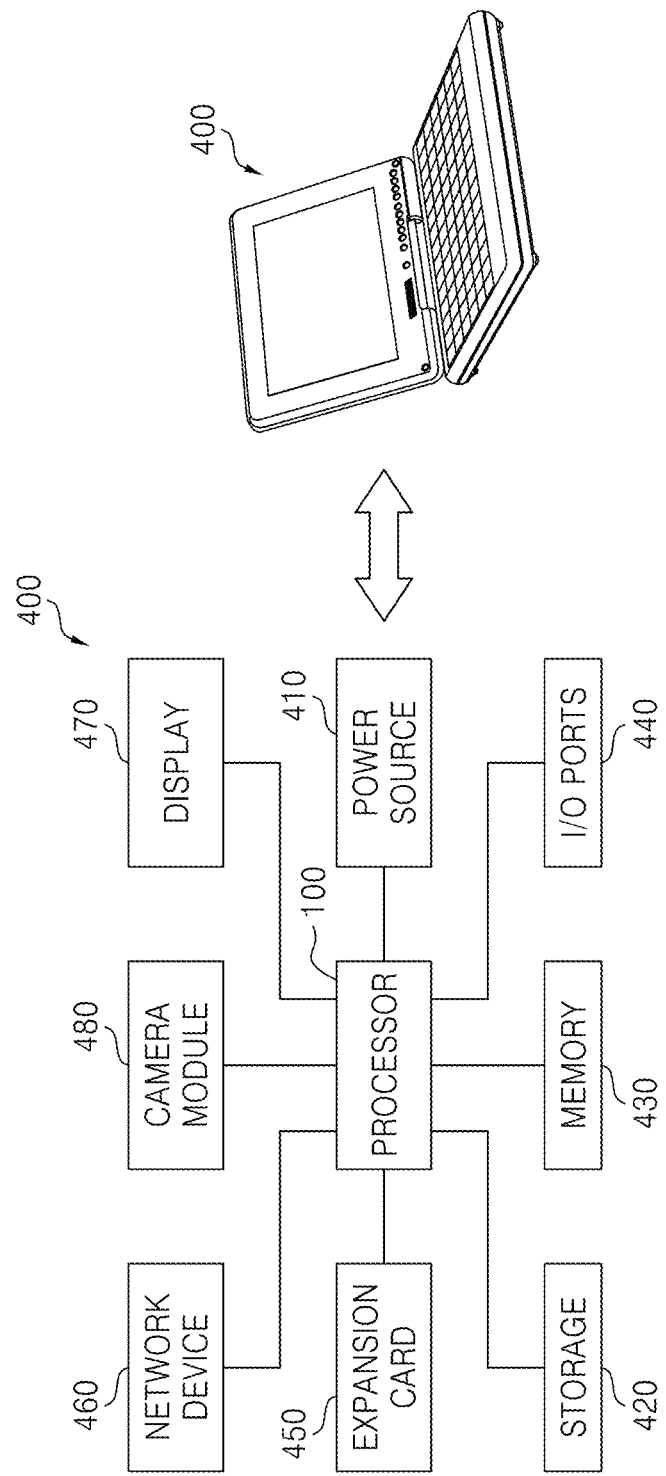
FIG. 13 is a block diagram of an electronic system including the SOC according to further embodiments of the inventive concept.

FIG. 13 is a block diagram of an electronic system including the SOC according to further exemplary embodiments of inventive concepts. Referring to FIG. 13, the electronic system 400 may be implemented as a laptop computer, for example.

Figure 14:
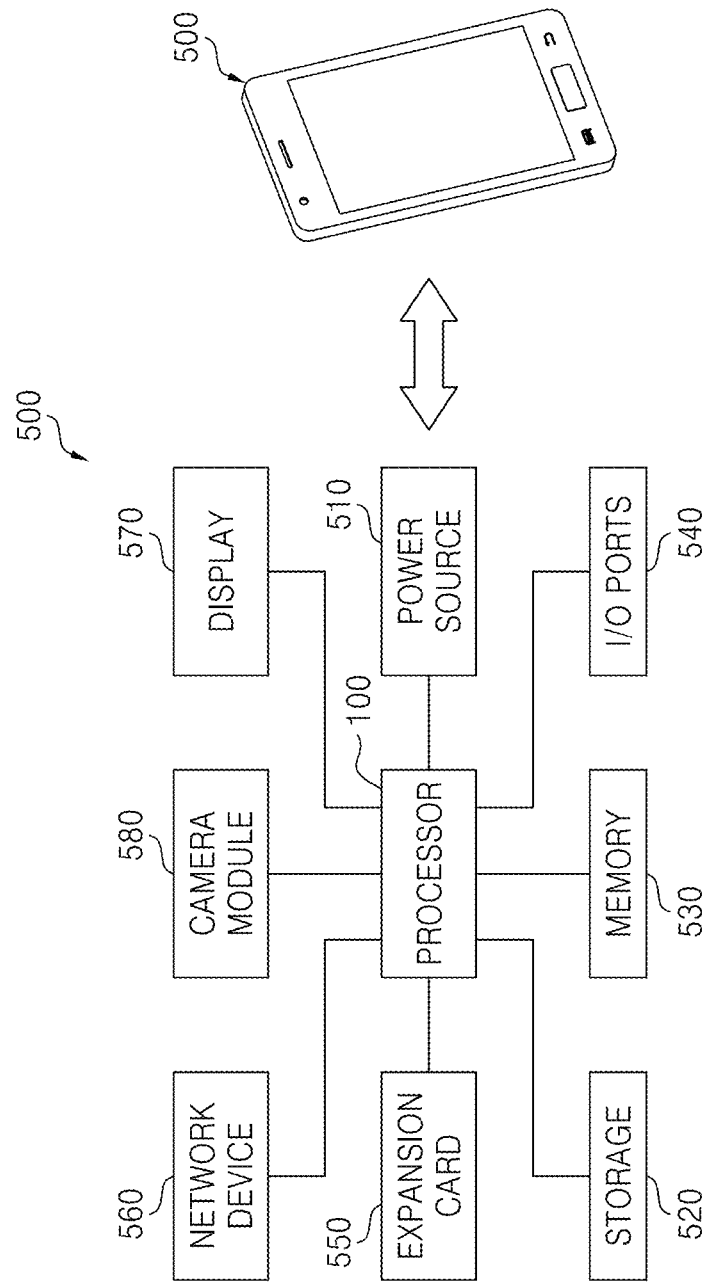
FIG. 14 is a block diagram of an electronic system including the SOC according to yet other embodiments of the inventive concept.

FIG. 14 is a block diagram of an electronic system including the SOC according to other exemplary embodiments of inventive concepts. Referring to FIG. 14, the electronic system 500 may be implemented as a portable device which may be a cellular phone, a smart phone, a tablet personal computer (PC), a personal digital assistant (PDA), an enterprise digital assistant (EDA), a digital still camera, a digital video camera, a portable multimedia player (PMP), portable navigation device (PND), a handheld game console, or an e(electronic)-book device, for example.

Inventive concepts may also be embodied as computer-readable codes on a computer-readable medium. The computer-readable recording medium may be any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network-coupled computer systems so that the computer-readable code is stored and executed in a distributed fashion. Also, functional programs, codes, and code segments to accomplish the present general inventive concept can be easily construed by programmers.

While inventive concepts have been particularly shown and described with reference to exemplary embodiments thereof, it will be understood that various changes in form and details may be made therein without departing from the spirit and scope of the following claims.

What is claimed is:

1. A system-on chip (SOC) comprising:
    a central processing unit (CPU) to operate a dynamic voltage frequency scaling (DVFS) control unit,
    the DVFS control unit comprising:
    a SOC load calculating unit to calculate a SOC load based on at least one element of the SOC;
    a DVFS table selecting unit for determining a scenario of a CPU operation based on a result of analyzing a pattern of the SOC load or according to an external input, and determining a DVFS table suitable for the scenario; and
    a DVFS calculating unit for determining a DVFS operation corresponding to the SOC load and a current operating frequency, based on the determined DVFS table among a plurality of DVFS tables,
    wherein each of the plurality of DVFS tables is configured to comprise up-thresholds and down-thresholds corresponding to operating frequencies of the CPU, and
    the up-thresholds and the down-thresholds are calculated based on a plurality of OFSL (Operating Frequency to SOC Load) ratio values corresponding to the ratio between each of the plurality of operating frequencies and the SOC load.

2. The SOC of claim 1, wherein the DVFS control unit further comprises a DVFS table storing unit for storing the plurality of DVFS tables and providing the plurality of DVFS tables to the DVFS table selecting unit.

3. The SOC of claim 1,
    wherein in some of the plurality of DVFS tables, ratios between the operating frequencies and the up-thresholds vary according to the operating frequencies.

4. The SOC of claim 1,
    wherein in some of the plurality of DVFS tables, ratios between the operating frequencies and the down-thresholds vary according to the operating frequencies.

5. The SOC of claim 1, wherein the external input comprises application execution information and a CPU control signal.

6. The SOC of claim 1, wherein the DVFS table selecting unit determines a DVFS table suitable for the scenario by selecting at least one of the plurality of DVFS tables.

7. The SOC of claim 1, wherein the DVFS operation comprises a first policy and a second policy,
    wherein the first policy increases the operating frequency of the CPU and an operating voltage of the SOC, and the second policy decreases the operating frequency of the CPU and the operating voltage of the SOC.

8. The SOC of claim 1, further comprising:
a performance monitoring unit for measuring the memory usage of at least one of the elements of the SOC and transmitting information regarding the memory usage to the DVFS control unit; and
a clock management unit for changing an operating frequency of the CPU to perform the DVFS operation, under control of the DVFS control unit.

9. An electronic system comprising
the SOC of claim 1; and
a power management integrated circuit for generating an operating voltage of the SOC and applying the operating voltage to the SOC so as to perform a dynamic voltage frequency scaling (DVFS) operation.

10. A dynamic voltage frequency scaling (DVFS) controlling method comprising:
calculating a system-on chip (SOC) load on at least one of elements of a SOC;
determining a scenario of a central processing unit (CPU), based on analyzing a pattern of the SOC load or according to an external input;
determining whether a current DVFS table is to be replaced with another DVFS table depending on the scenario; and
determining a DVFS operation corresponding to the SOC load and an operating frequency of the CPU, based on the current DVFS table or a replaced DVFS table,
wherein each of the plurality of DVFS tables is configured to comprise up-thresholds and down-thresholds corresponding to operating frequencies of the CPU, and
the up-thresholds and the down-thresholds are calculated based on a plurality of OFSL (Operating Frequency to SOC Load) ratio values corresponding to the ratio between each of the plurality of operating frequencies and the SOC load.

11. The DVFS controlling method of claim 10, if it is determined that the current DVFS table is to be replaced with another DVFS table, further comprising determining a DVFS table suitable for the scenario by selecting at least one of a plurality of DVFS tables.

12. The DVFS controlling method of claim 11,
and in some of the plurality of DVFS tables, ratios between the operating frequencies and the up-thresholds vary according to the operating frequencies.

13. The DVFS controlling method of claim 11,
wherein in some of the plurality of DVFS tables, ratios between the operating frequencies and the down-thresholds vary according to the operating frequencies.

14. The DVFS controlling method of claim 10, wherein the external input comprises application execution information and a CPU control signal.

15. The DVFS controlling method of claim 10, wherein the DVFS operation comprises a first policy and a second policy,
wherein the first policy instructs to increase an operating frequency of CPU and an operating voltage of the SOC, and
the second policy instructs to decrease the operating frequency of the CPU and the operating voltage of the SOC.

16. A system on a chip (SOC), comprising:
a multi-core processor;
system elements; and
a dynamic voltage frequency scaling (DVFS) controller, the DVFS controller to allot greater or lesser power to the SOC depending upon the SOC's mode of operation and current operating frequency, wherein the DVFS controller is configured to determine the mode of operation by analyzing system activity and to allot greater or lesser power according to one of a plurality of DVFS tables selected on the basis of a load pattern or an external input, wherein the external input comprises application execution information and/or a CPU control signal and each of the plurality of DVFS tables is configured to comprise up-thresholds and down-thresholds corresponding to operating frequencies of the CPU, and
the up-thresholds and the down-thresholds are calculated based on a plurality of OFSL (Operating Frequency to SOC Load) ratio values corresponding to the ratio between each of the plurality of operating frequencies and the SOC load.

17. The SOC of claim 16, wherein the DFVS controller is configured to allot greater or lesser power by adjusting an operating frequency.

18. The SOC of claim 16, wherein the DVFS controller is configured to allot greater or lesser power by adjusting an operating voltage.

19. The SOC of claim 16, wherein the DVFS controller is configured to allot greater or lesser power by adjusting an operating voltage and frequency for a plurality of the cores of the multicore processor.

20. An electronic system including the SOC of claim 16.

* * * * *